United States Patent [19]

Uchiyama

[11] 3,806,818

[45] Apr. 23, 1974

[54] TUNING DEVICE FOR RECEIVERS

[75] Inventor: Yasuji Uchiyama, Kitahama, Japan

[73] Assignee: Nippon Gakki Seizo Kabushiki Kaisha, Hamamatsu-shi, Shizuoka-ken, Japan

[22] Filed: Dec. 23, 1971

[21] Appl. No.: 211,377

[30] Foreign Application Priority Data

| | | |
|---|---|---|
| Dec. 29, 1970 | Japan | 45-120876 |
| Dec. 29, 1970 | Japan | 45-120877 |
| Dec. 29, 1970 | Japan | 45-120878 |
| Dec. 29, 1970 | Japan | 45-120879 |
| Dec. 29, 1970 | Japan | 45-120880 |
| Feb. 26, 1971 | Japan | 46-10135 |
| Feb. 26, 1971 | Japan | 46-10136 |
| Mar. 15, 1971 | Japan | 46-17362 |
| Mar. 22, 1971 | Japan | 46-19921 |

[52] U.S. Cl. .......... 325/456, 325/398, 325/403, 325/404, 325/408, 325/417, 325/455, 325/457, 334/86

[51] Int. Cl. .......... H04b 1/16

[58] Field of Search .......... 325/397, 398, 403, 404, 325/408, 416, 417, 418, 455–457; 334/30, 31, 36, 86; 340/258 C, 258 D

[56] References Cited

UNITED STATES PATENTS 2,560,313 7/1951 Tellier .......... 325/417

*Primary Examiner*—Robert L. Griffin
*Assistant Examiner*—Marc E. Bookbinder

[57] ABSTRACT

In an FM radio receiver, its tuning section includes a touch detective control arrangement. A tuning knob member is insulated from the circuit ground and connected to an electrostatic field detection circuit to detect a touch of an operator's finger with the knob member. The detection circuit triggers a switching circuit which controls an easy-tuning-providing device such as a muting circuit, an AFC circuit and a tuning indicator. When a finger touches the knob member, the muting circuit is rendered operative, the AFC circuit non-operative, or the tuning indicator operative, thereby facilitating the tuning.

9 Claims, 16 Drawing Figures

INVENTOR
BY

INVENTOR.
BY

INVENTOR

BY

INVENTOR.
Yasuyo Akiyama
BY Ernest G. Montague
attorney

INVENTOR.
Kenji Kobiyama (signature)
BY Ernest Montague (signature)
Attorney

INVENTOR.
Yasuji Akiyama
BY Ernest G. Montague
Attorney

INVENTOR.
Yasuji Uchiyama
BY Ernest G. Montague
Attorney

INVENTOR.
Yasuji Uchiyama
BY
Ernest G. Montague
Attorney

TUNING DEVICE FOR RECEIVERS

TUNING DEVICE FOR RECEIVERS

The present invention relates to tuning devices for receivers, more particularly to a tuning device for FM radio receivers which uses an electrostatic field established at an operator's human body who touches his fingers with a tuning knob member insulated from the ground and in which the electrostatic field is detected to control an electronic switching circuit which selectively operates a muting circuit, AFC circuit, tuning indicator etc.

In receivers, particularly FM radio receivers, a local oscillation frequency is caused to be undesirably, varied owing to exterior conditions such as temperature rise, change of a supply voltage source or humidity change etc., with the result that a correctly tuned condition could not be maintained for a long time, that detuning occurs during operation to prevent an excellent FM detection, that distortion is increased in the reproduced sound, and that the stereo-separation is deteriorated. As means for obviating the above mentioned disadvantages, heretofore, it has been proposed to use an AFC (automatic frequency control) circuit which makes use of a DC output signal from a detector circuit for the purpose of bringing the local oscillation frequency to a correct tuning point.

One of the prime objects of the invention is to provide a tuning device for receivers which makes use of a tuning knob member to detect an electrostatic field established at an operator's human body who touches his fingers with the tuning knob, thereby obtaining an optimum signal receiving condition.

A further object of the invention is to provide a tuning device for receivers which uses a tuning knob member made of an electric conductive material and insulated from the ground and which when operated at the time of selecting a desired broadcasting station can detect an electrostatic field established at an operator's human body who touches his fingers with the tuning knob member, thus enabling the automatic operation of an AFC circuit to be simply and reliably obtained.

Another object of the invention is to provide a tuning device for receivers which uses a tuning knob member made of an electric conductive material and insulated from the ground and which when operated at the time of selecting a desired broadcasting station can detect an electrostatic field established at an operator's human body who touches his fingers with the tuning knob member, thus enabling the automatic operation of a muting circuit to be simply and reliably obtained.

A still further object of the invention is to provide a tuning device for receivers which uses a tuning knob member made of an electric conductive material and consisting of two tuning knobs insulated one from the other and insulated from the ground and which when operated at the time of selecting a desired broadcasting station can detect an electrostatic field established at an operator's human body who touches his fingers with the tuning knob member, thus enabling the automatic operations of both AFC circuit and muting circuit to be simply and reliably obtained.

A further object of the invention is to provide a tuning device for receivers which uses an electrostatic field detection circuit for detecting an electrostatic field established at an operator's human body who touches his fingers at a tuning knob member and which when the operator makes his fingers in contact with the tuning knob member can change and control the level of a muting circuit.

Another object of the invention is to provide a tuning device for receivers which uses an electrostatic field detection circuit for detecting an electrostatic field established at an operator's human body who touches his fingers with a tuning knob member and which when the operator makes his fingers in contact with the tuning knob member can change and control the strength of an AFC circuit.

A still further object of the invention is to provide a tuning device for receivers which uses an electrostatic field detection circuit for detecting an electrostatic field established at an operator's human body who touches his fingers with a tuning knob member and which when the operator makes his fingers in contact with the tuning knob member can energize a dial illuminating lamp, thereby indicating the signal receiving condition.

A further object of the invention is to provide a tuning device for receivers which uses an electrostatic field detection circuit for detecting an electrostatic field established at an operator's human body who touches his fingers with a tuning knob member and which when the operator makes his fingers in contact with the tuning knob member can automatically operate a tuning indicator.

Other objects, features and advantages of the invention will become apparent from a consideration from the following specification, when the specification in conjunction with the accompanying drawing, which illustrates in:

Figure 1:
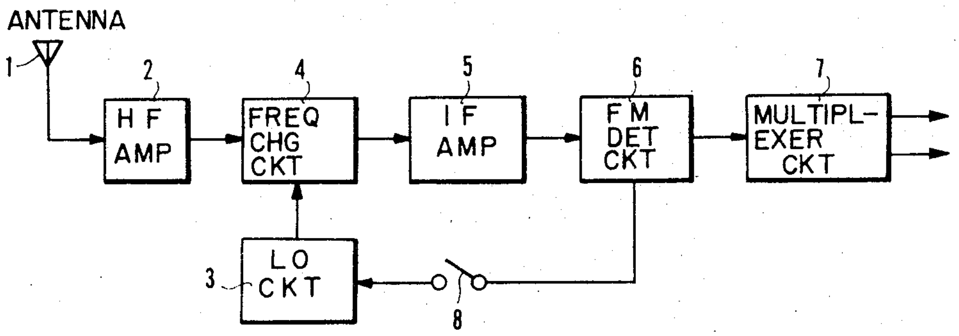
FIG 1 (PRIOR ART)
FIGS. 1 – 3 are block diagrams showing conventional tuning device including an AFC circuit, muting circuit and AFC-muting circuit, respectively.

Referring to FIG. 1 showing a conventional FM receiver which makes use of the above mentioned kind of AFC circuit and in which the input signal arrived at a receiving antenna 1 is selectively amplified at a high frequency amplifier circuit 2 and the signal thus amplified is supplied to a frequency changer (converter) circuit 4 used to change the frequency of the ampplified signal with the aid of the frequency of a local oscillator circuit 3. The output of the frequency changer circuit 4 is supplied through an intermediate frequency amplifier circuit 5 to an FM detector circuit 6 whose output is supplied as an audio frequency signal to a multiplexer circuit 7 for demodulating the output from the FM detector circuit 6 into two kinds of audio frequency signal (right and left signals).

A part of the signal from the FM detector circuit 6 is applied through a mechanical AFC switch 8 to a frequency control element of the local oscillator circuit 3 which makes the difference between the received signal frequency and the local oscillation frequency automatically equal to the optimum intermediate frequency.

In the above mentioned conventional FM radio receiver, if broadcasting stations are selected with the mechanical AFC switch 8 closed, there occurs an AFC drawing effect which produces hysteresis at the time of selecting stations so that it becomes considerably difficult to find a correct tuning point. Moreover, if it is desired to receive, with the AFC switch 8 closed, a weak broadcasting signal just near in frequency to a strong broadcasting signal, there has been tendency of the strong signal to draw in the weak signal, and this makes the reception of the weak signal impossible.

Thus, it has been the common practice to open the mechanical AFC switch 8 when selecting then close it again at a substantially tuned condition so as to automatically bring the receiver into the optimum tuned condition.

However, the conventional FM receivers such as shown in FIG. 1 have the disadvantage that the mechanical AFC switch 8 must always be operated at the time of selecting the broadcasting stations and hence is troublesome in operation, and that there is risk of the broadcasting stations being selected without opening the mechanical AFC switch 8 and of the mechanical AFC switch 8 remaining opened even after the stations have been selected with the result that a sufficient care must be taken for the off and on conditions of the mechanical AFC switch 8.

Furthermore, the above mentioned conventional FM radio receiver has commonly been designed to be highly sensitive to the frequency of the broadcasting signal, so that in the absence of the broadcasting signal between stations at the time of selecting the stations, i.e. in so-called detuned condition there occurs considerably large noise which is unpleasant and untolerable to listeners, whereas there is no problem when the receiver is correctly tuned with the broadcasting frequency of a given broadcasting station.

In order to obviate such disadvantage it has been proposed to provide a muting circuit which is adapted to automatically interrupt the noise and hence prevent the output of the receiver from involving the noise in the detuned condition.

Figure 2:
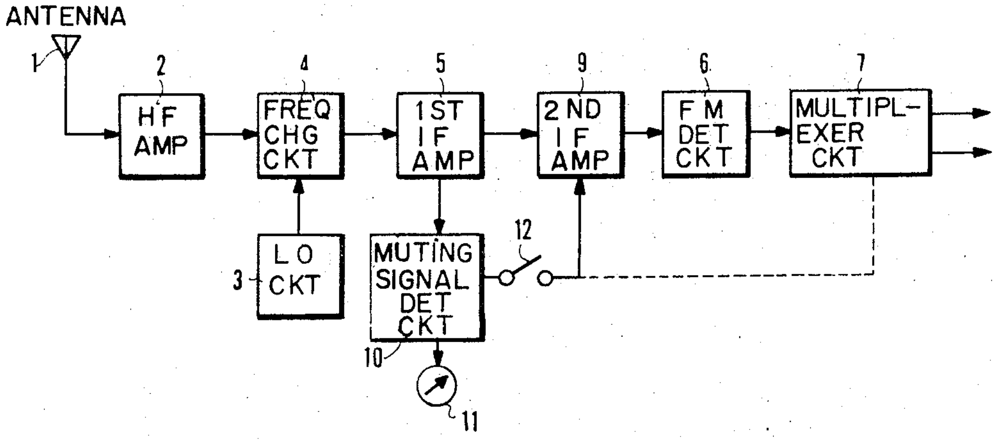
FIG 2 (PRIOR ART)

In FIG. 2 there is shown a conventional FM receiver which makes use of the above mentioned muting circuit and comprises a high frequency amplifier circuit 2 for selectively amplifying the input signal arrived at a receiving antenna 1, a frequency changer (converter) circuit 4 which also has supplied thereto the frequency from a local oscillator circuit 3 and which serves to convert the frequency of the amplified signal from the high frequency amplifier circuit 2 to the intermediate frequency, first and second intermediate frequency amplifier circuits 5 and 9 for amplifying the output from the frequency changer circuit 4, an FM detector circuit 6, and a multiplexer circuit 7 for demodulating the output from the FM detector circuit 6 into two kinds of audio frequency signals (right and left signals). Provision is made of a muting signal detector circuit 10 for detecting the presence or absence of the broadcasting signal in the first intermediate frequency amplifier circuit 5 at the time of selecting a desired broadcasting station. The muting signal detector circuit 10 serves to maintain the second intermediate frequency amplifier circuit 9 or the multiplexer circuit 7 in its inoperative (or less operative) condition in the absence of the broacasting signal in the first intermediate frequency amplifier circuit 5, thereby reliably interrupting the noise in the detuned condition. It has been the common practice to set the level of the muting signal detector circuit 10 such that it can detect the broadcasting signal which is stronger than the background noise. A meter 11 is connected to the muting signal detector circuit 10 for measuring the presence or absence the strength of the broadcasting signal. Thus, it is necessary to provide a switch 12 which is connected between the muting signal detector circuit 10 and a circuit controlled by it for releasing the muting operation at the time of receiving a desired broadcasting signal whose level is substantially equal to the noise level. Heretofore, it has been the common practice to make the above mentioned tuning operation on or off with the aid of a mechanical switch 12 as shown in FIG. 2. Thus, it is necessary to open the mechanical muting switch 12 at the time of receiving the broadcasting signal and then select a desired station by means of a tuning knob and subsequently to close the mechanical muting switch 12 close again. Thus, the conventional FM receiver shown in FIG. 2 has disadvantage that it is troublesome in operation, that the tuning knob member must be located at a position which is comparatively near the mechanical muting switch for ease of operation, and that a limitation is given to designing of the front panel to which is secured the tuning knob member and mechanical muting switch and to reliability of the mechanical muting switch.

Figure 3:
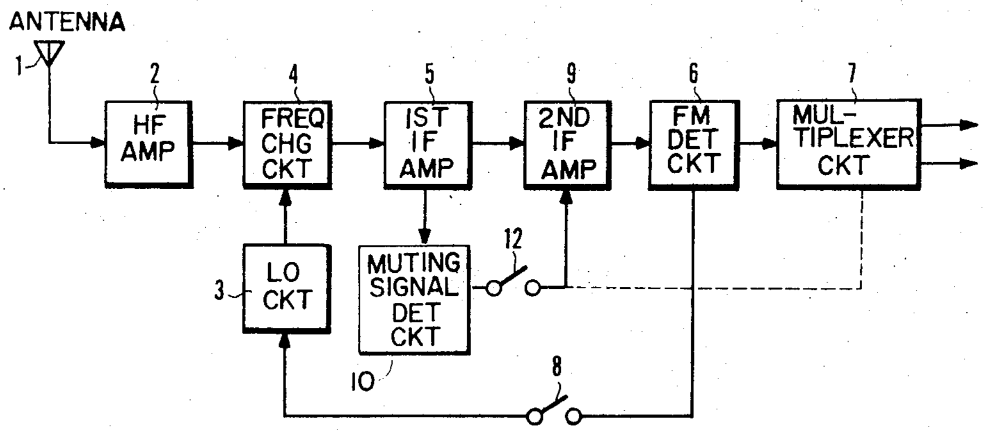
FIG 3 (PRIOR ART)

In FIG. 3 there is shown a conventional FM receiver which makes use of both AFC circuit and muting circuit and comprises a mechanical muting switch 12 connected between a muting signal detector circuit 10 and a second intermediate frequency amplifier circuit 9 for eliminating the interstation noise and a mechanical AFC switch 8 connected between an FM detector circuit 6 and a local oscillator circuit 3 for maintaining the optimum signal receiving condition. However, such FM receiver has also the disadvantage that both the mechanical AFC switch 8 and mechanical muting switch 12 must manually be operated, thereby making the operation troublesome.

Now, the invention will be described with reference to FIGS. 4 – 16.

Figure 4:
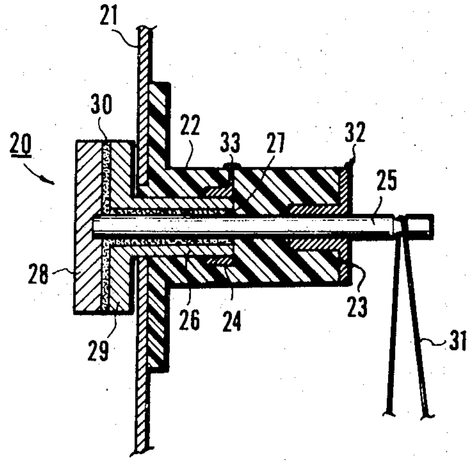
FIG. 4 is a sectional view of a tuning knob member used for the tuning device for receivers according to the invention.

In FIG. 4 is shown a tuning knob 20 which is used for the tuning device for receivers according to the invention. 21 designates a front panel having an opening into which is secured a bearing holder 22 made of insulating material such as synthetic resin. The bearing holder 22 is provided at its center with stepped bores whose diameter is large at the panel side into which is fitted an annular electric conductive bearing 24 while into the reduced diameter portion is fitted a cylindrical electric conductive bearing 23. A rotary shaft 25 of an electric conductive material is rotatably journalled in the bearing 23 in electrical contact therewith and has its one end extended through the front panel 21. A sleeve 26 of an electric conductive material is inserted from the front panel 21 into the bearing holder 22 and is rotatably journalled in the bearing 24 in electrical contact therewith and is adapted to rotate through an insulating inner sleeve 27 surrounding the rotary shaft 25.

To the front end of the rotary shaft 25 is secured a first tuning knob member 28 of an electric conductive material and with the front end of the sleeve 26 is integrally formed a second tuning knob member 29, an insulating plate 30 being inserted between the first and second tuning knob member 28 and 29. The rotary shaft 25 is provided at its free end with a belt 31 for driving a tuning variable capacitor (not shown). The above construction renders it possible to insulate the first and second tuning knob members 28 and 29 one from the other and also both from the circuit ground.

The bearings 23 and 24 are provided with connection terminals 32 and 33, respectively, one of these terminals being connected to an input terminal 35 of an electrostatic field detection circuit 34 to be described later with reference to FIG. 5.

Figure 5:
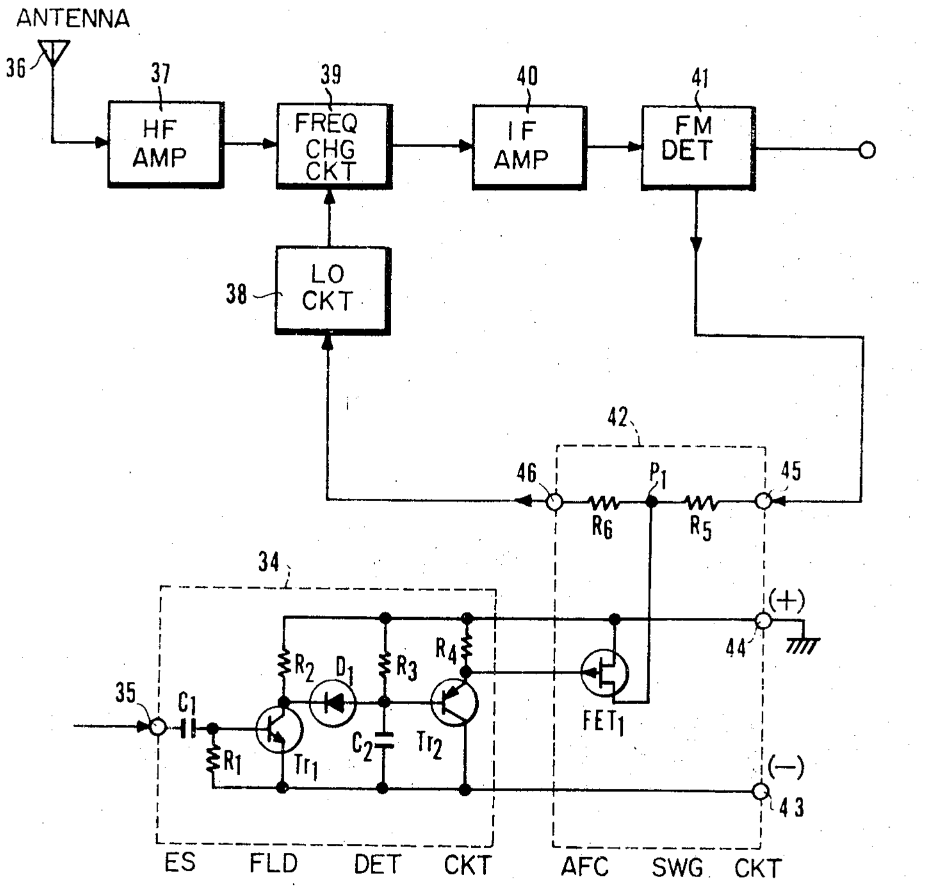
FIG. 5 is a block diagram showing an embodiment of the tuning device for receivers according to the invention, the circuit elements and connection thereof for the electrostatic field detection circuit and electronic AFC switching circuit being shown in details.

In FIG. 5 is shown one embodiment of the tuning device for receivers according to the invention which is applied to the tuning device for an FM receiver. The tuning device shown in FIG. 5 comprises a receiving antenna 36, a high frequency amplifier circuit 37, a local oscillator circuit 38, a frequency changer circuit 39, an intermediate frequency amplifier circuit 40 and an FM detector circuit 41 and in which the input signal arrived at the receiving antenna 36 is supplied to the high frequency amplifier circuit 37 which selects a given broadcasting frequency and amplifies it. The signal thus amplified is supplied to the frequency changer circuit 39 which also has supplied thereto a signal from the local oscillator circuit 38 and changes the received frequency to an intermediate frequency signal that is applied to the intermediate frequency amplifier circuit 40 which produces an amplified signal that is detected by the FM detector circuit 41.

A part of the output of the FM detector circuit 41 is supplied as an AFC signal through an electronic switching circuit 42 to the local oscillator circuit 38. The electronic switching circuit 42 is adapted to be controlled to on or off by the output of the electrostatic field detection circuit 34.

The input terminal 35 of the electrostatic field detection circuit 34 is connected through a capacitor $C_1$ to the base of a first transistor $Tr_1$, which base is connected through a resistor $R_1$ to a terminal 43, the emitter being connected also to the terminal 43 to which is connected a negative pole of a direct current supply source (not shown).

The collector of the first transistor $Tr_1$ is connected through a resistor $R_2$ to a grounded terminal 44 to which is connected a positive pole of the direct current supply source and through a diode $D_1$ to the base of a second transistor $Tr_2$.

The base of the second transistor $Tr_2$ is connected through a resistor $R_3$ to the grounded terminal 44 and through a capacitor $C_2$ to the supply source terminal 43. The collector of the second transistor $Tr_2$ is directly connected to the supply source terminal 43 and the emitter is connected through a resistor $R_4$ to the grounded terminal 44 and directly connected to the gate of a field effect transistor $FET_1$ of the AFC switching circuit 42.

The source of the field effect transistor $FET_1$ is directly connected to the grounded terminal 44 and the drain thereof is connected to a connection point $P_1$ between resistors $R_5$ and $R_6$.

The other end of the resistor $R_5$ is connected to an input terminal 45 which also is supplied thereto the output from the FM detector circuit 41 as an AFC signal.

The opposite end of the resistor $R_6$ is connected to the output terminal 46 of the AFC switching circuit 42 connected to the local oscillator circuit 38.

The operation of the tuning device for receivers according to the invention shown in FIG. 5 is as follows.

In case of selecting a desired broadcasting station whose signal arriving at the receiving antenna 36, the tuning knob is manually rotated to rotate the rotary shaft 25 which causes a rotation through the belt 31 of the gang variable capacitor condenser (not shown) respectively for the high frequency amplifier circuit 37 and for the local oscillator circuit 38, thereby selecting the desired broadcasting station.

At the same time, the electrostatic field established at the operator's human body is applied as an alternating signal through that knob member which is connected to the terminal 35 among the first and the second tuning knob members 28 and 29, rotary shaft 25 or 26, bearing 23 or 24 and connection terminal 32 or 33 to the input terminal 35 of the electrostatic field detection circuit 34. This signal causes the first transistor $Tr_1$ to become conductive and thereby the second transistor $Tr_2$ also conductive. Thus, the emitter voltage of the second transistor $Tr_2$ becomes negative to make the field effect transistor $FET_1$ conductive with the result that the connection point $P_1$ between the resistors $R_5$ and $R_6$ is shunted by the conducting field effect transistor $FET_1$ to the terminal 44 of the ground potential. The potential of the connection point $P_1$ becomes zero to interrupt the local oscillator circuit 38 from the FM detector circuit 41 thereby rendering the AFC operation inoperative.

When the correct tuning with the frequency signal from the desired broadcasting station is substantially obtained by the tuning knob operation, the operator releases his fingers from the tuning knob 20 to eliminate the electrostatic field input applied to the input terminal 35 of the electrostatic field detection circuit 34. Thus, the input into the field effect transistor $FET_1$ becomes zero which causes it to make nonconductive.

The potential at the connection point $P_1$ between the resistors $R_5$ and $R_6$ becomes a given potential with respect to the ground to supply the AFC signal from the FM detector circuit 41 through the input terminal 45, resistors $R_5$, $R_6$, output terminal 46 of the AFC switching circuit 42 to the local oscillator circuit 38 whereby the receiver is automatically stabilized at the correctly tuned point.

Figure 6:
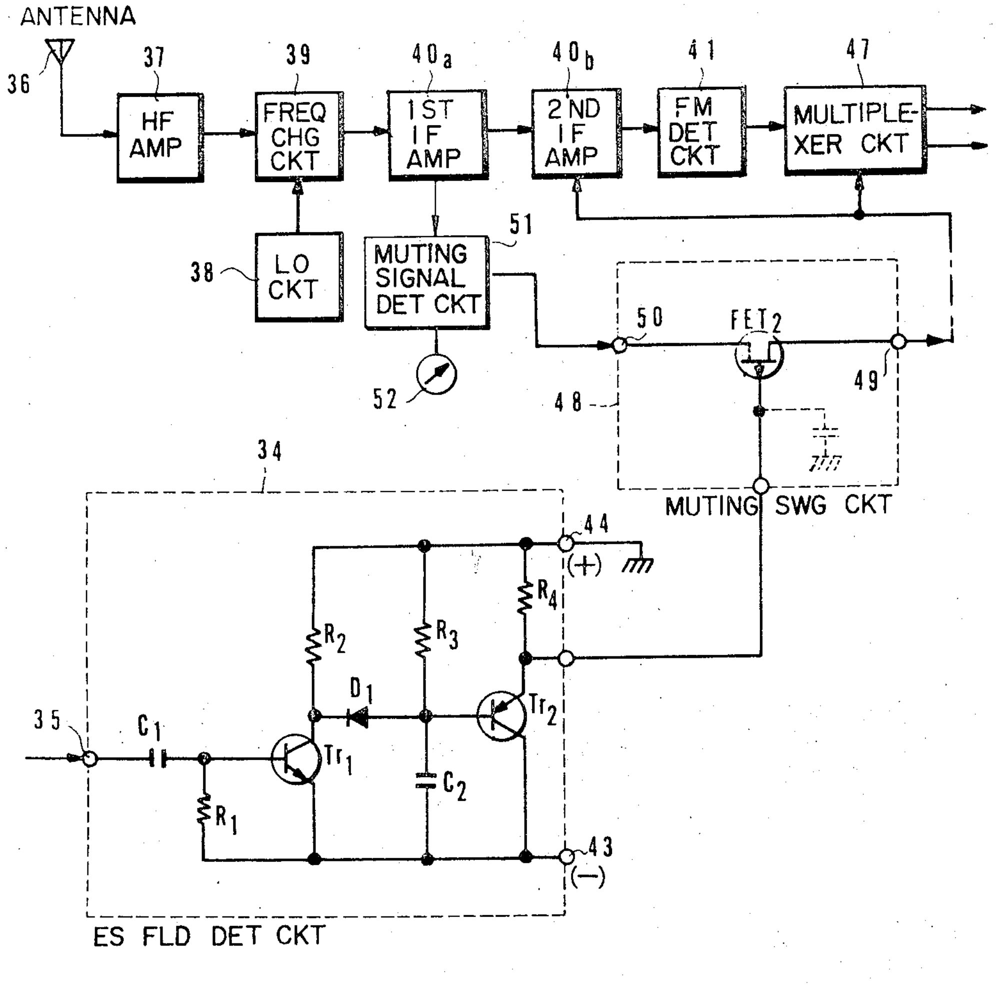
FIG. 6 is a block diagram showing another embodiment of the tuning device for receivers according to the invention, the circuit elements and connection thereof for the electrostatic field detection circuit and electronic tuning signal switching circuit being shown in details.

In FIG. 6 is shown another embodiment of the tuning device for receivers according to the invention in which use is made of the tuning knob 20 to detect the electrostatic field which can control the operation of a muting circuit. Parts already described with reference to FIG. 5 are denoted in FIG. 6 by the same reference numerals as in the previous embodiment and are neglected the explanation thereof. Parts different from those already described will only be described.

The output terminal of a frequency changer circuit 39 is connected in cascade through a first intermediate frequency amplifier circuit 40*a*, a second intermediate frequency amplifier circuit 40*b*, and an FM detector circuit 41 to a multiplexer circuit 47. The output terminal 49 of an electronic muting switching circuit 48 controlled by an electronic control signal is connected to the input terminal of the multiplexer circuit 47 or to the input terminal of the second intermediate frequency amplifier circuit 40*b* (both shown in this drawing). The electronic muting switching circuit 48 essentially consists of a field effect transistor $FET_2$ whose source is connected to an output terminal 49 and drain is connected to an input terminal 50.

The input terminal 50 is connected to the output terminal of a muting signal detector circuit 51 whose input terminal is connected to the first intermediate frequency amplifier circuit 40a while whose output terminal is connected to an indicator device 52 for indicating the absence or presence of the broadcasting signal and the strength of the latter.

The gate of the field effect transistor $FET_2$ of the electronic muting switching circuit 48 is connected to the output terminal of the electrostatic field detection circuit 34, i.e. to the emitter of the second transistor $Tr_2$. The electrostatic field detection circuit 34 is the same in construction and operation as the electrostatic field detection circuit 34 shown in FIG. 5.

The operation of the tuning device for receiver according to the invention shown in FIG. 6 is as follows.

As stated hereinbefore, if the tuning knob 20 is manually rotated, the shaft of the gang variable capacitors for the high frequency amplifier circuit 37 and the local oscillator circuit 38 is rotated to select a given broadcasting station.

The disadvantage of the aforesaid, known broadcasting station selecting operation with the aid of the tuning knob 20 consists in occurrence of so-called interstation noise.

However, in the tuning device shown in FIG. 6 if the operator's fingers become in touch for example, with the first tuning knob member 28, the electrostatic field detection circuit 34 operates to detect the electrostatic field established at the operator's human body and supply a control signal from its output terminal, i.e. from the emitter of the second transistor $Tr_2$ to the gate of the field effect transistor $FET_2$ of the electronic muting switching circuit 48. Thus, the field effect transistor $FET_2$ becomes conductive to short the circuit between the output terminal of the muting detection circuit 51 and the second intermediate frequency amplifier circuit 40*b* or the multiplexer circuit 47. The output of the multiplexer circuit 47 in turn is not impressed upon succeeding stages with the result that the inter-station noise produced during selection of the broadcasting stations is not transmitted to the audio-frequency amplifier stage.

Under such condition when the receiver is correctly tuned with the desired broadcasting station the operator can release his fingers from the first tuning knob 28 to eliminate the electrostatic field input into the electrostatic field detection circuit 34. The first and second transistors $Tr_1$ and $Tr_2$ become non-conductive to make the muting switching circuit 48 off. Thus, the muting signal from the muting signal detection circuit 51 is not applied to the second intermediate frequency amplifier circuit 40*b* or to the multiplexer circuit 47, thereby operating the receiver in its normal condition.

The muting switching circuit 48 may include a time constant circuit such as shown in dotted line which is capable of making the muting switching circuit 48 remain in its operating condition for a desired duration for the purpose of preventing introduction of the noise into the output in the absence of the broacasting signal even when the operator temporarily releases his fingers from the tuning knob member.

Figure 7:
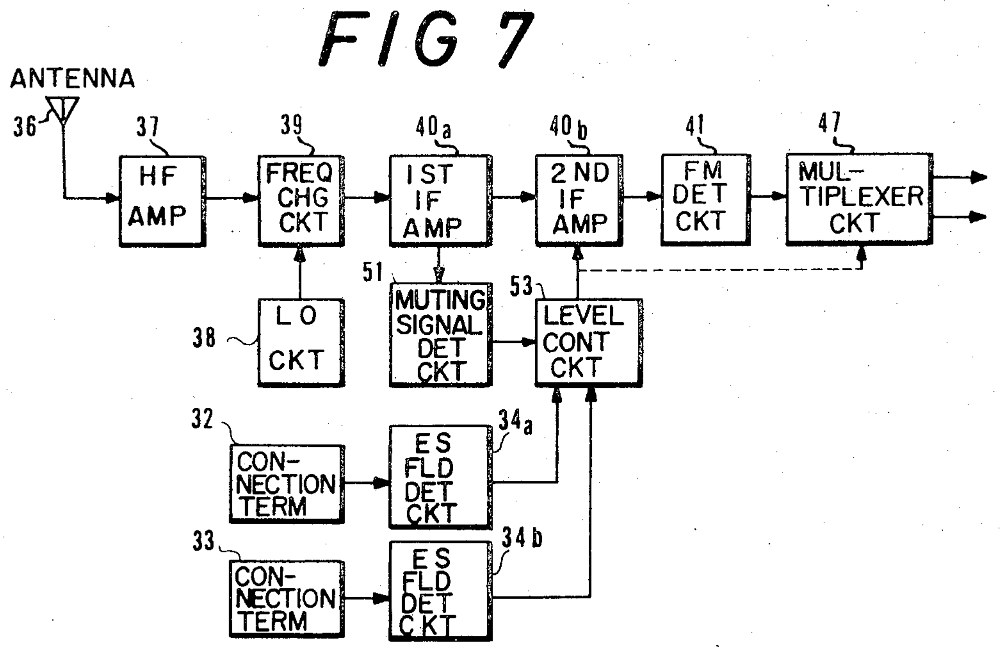
FIGS. 7 – 10 are block diagrams showing another various embodiments of the tuning device for receivers according to the invention.

In FIG. 7 is shown another embodiment of the tuning device for receivers according to the invention in which use is made of the change in the electrostatic field established at the operator's human body in response to his finger's touch with either one or both of the first and second tuning knobs 28 and 29 shown in FIG. 4 and this change in the electrostatic field is detected to operate a level control circuit thereby automatically controlling the operation of the muting circuit with a suitable level. Parts already described with each of the above mentioned embodiments are denoted in FIG. 7 by the same reference numerals as in the previous embodiments and are neglected the explanation thereof. Parts different from those already described will only be described.

The muting signal detection circuit 51 serves to detect the absence of the broadcasting signal at the first intermediate frequency amplifier circuit 40*a*. The signal thus detected, that is, the muting signal is supplied through a level control circuit 53 to the second intermediate frequency amplifier circuit 40*b* or to the multiplexer circuit 47, whereby making the latter inoperative and hence eliminating the transmission of the objectionable noise etc. to the low frequency amplifier circuit.

Electrostatic field detection circuits 34*a* and 34*b*, respectively, are provided and are the same in circuit arrangement and operation as the electrostatic field detection circuit 34 shown in FIGS. 5 and 6. The output terminals of these electrostatic field detection circuits 34*a* and 34*b* are connected to the level control circuit 53. The input terminal of the electrostatic field detection circuit 34*a* is connected to the connection terminal 32 of the first tuning knob member 28 shown in FIG. 4, while the input terminal of the electrostatic field detection circuit 34*b* is connected to the connection terminal 33 of the second tuning knob member 29.

The operation of the embodiment shown in FIG. 7 is as follows. In case of selecting a desired broadcasting station, if the first tuning knob member 28 or the second tuning knob member 29 of the tuning knob 20 is manually rotated, the shaft of the gang variable capacitors for the high frequency amplifier circuit 37 and for the local oscillator circuit 38 is rotated to select the desired broadcasting station from a number of broadcasting stations. In this case, if the operator's fingers in touch only the first tuning knob member 28, the electrostatic field established at the operator's human body is applied through the bearing 23 and connection terminal 32 to the electrostatic field detection circuit 34*a*, which amplifies it, and the electrostatic field thus amplified can control the level control circuit 53.

If the operator's fingers become in touch with only the second tuning knob member 29, the electrostatic field established at the operator's human body is supplied through the bearing 24 and connection terminal 33 to the electrostatic field detection circuit 34*b*, whose output can operate the level control circuit 53 in the similar manner as described above.

If the operator's fingers become in touch with both the first and second tuning knob members 28 and 29, the electrostatic field established at the operator's human body can be detected by both the electrostatic field detection circuits 34*a* and 34*b*, whose outputs can control the level control circuit 53.

Thus, the manual operation of the tuning knob 20 touching with either one or both of the tuning knob members 28 and 29 makes it possible to vary the level of the muting signal from the level control circuit 53. The two examples of the mutual relation among the selective touch with the tuning knob members 28 and 29, the level of the muting signal, the output of the first intermediate frequency amplifier circuit 40*a* and the receivable broadcasting signal are shown in the following Tables 1 and 2.

Table 1 (first example)

| Tuning knob member touched | Level of muting signal | Output fron first intermediate frequency amplifier circuit **40***a* | Receivable broadcasting signal |
|---|---|---|---|
| **28** | Low | Large | Weak electric field |
| **29** | Inter-mediate | Medium | Medium electric field |
| **28+29** | High | Small | Strong electric field |
| **28** | 0 | Large | Muting off |
| **29** | Low | Large | Weak electric field |
| **28+29** | High | Small | Strong electric field |

As seen from the above Examples 1 and 2, the level control circuit 53 becomes operated in dependence with a condition whether either one or both of the tuning knob members 28 and 29 is or are in contact with the operator's fingers. Thus, the output from the muting signal detection circuit 51 is capable of performing through the level control circuit 53 the muting operation for the second intermediate frequency amplifier circuit 40*b* or the multiplexer circuit 47. This muting operation ensures an elimination of the large noise even when detuned condition occurs during selection of the broadcasting station, with the result that the selecting operation can be carried out in any easy and pleasant manner. Moreover, the muting operation can be automatically controlled in three different levels by merely touching the operator's fingers with either one or both of the tuning knob members 28 and 29 so that this muting operation can be performed by a person without having any skill.

Figure 8:
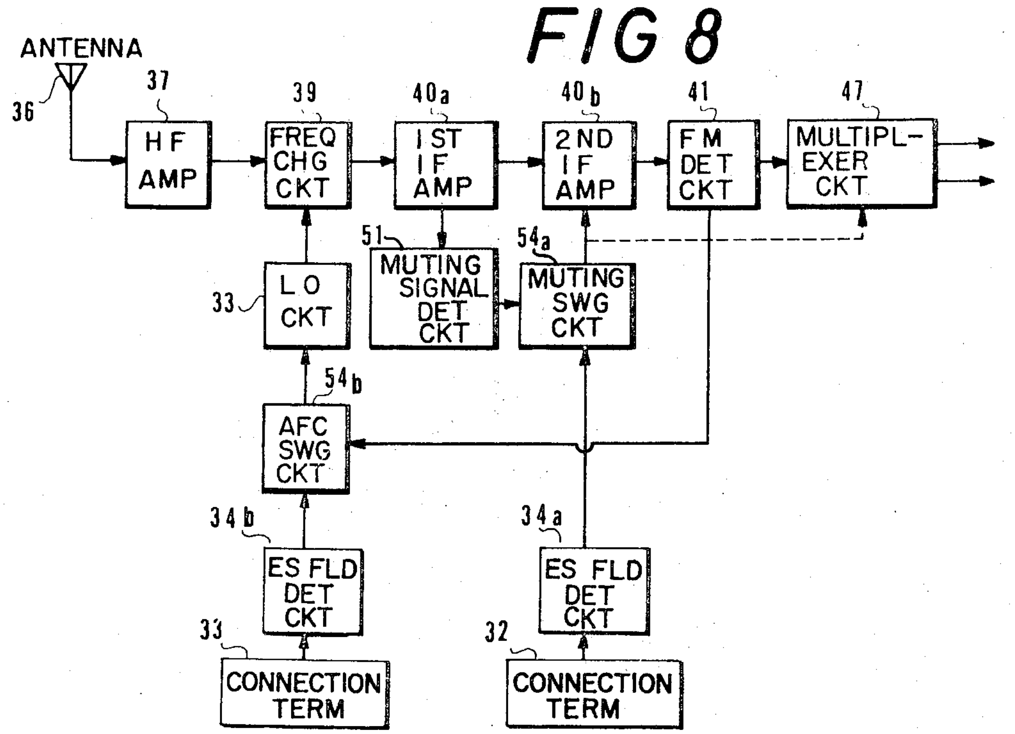

In FIG. 8 is shown another embodiment of the tuning device for receivers according to the invention which is adapted to perform the muting operation described with reference to FIG. 6 as well as the AFC operation described with reference to FIG. 5.

In the present embodiment, the absence of the broadcasting signal at the first intermediate frequency amplifier circuit 40*a* is detected by the muting signal detection circuit 51 and the signal thus detected, i.e. the muting signal is supplied through an electronic muting switching circuit 54*a* to the second intermediate frequency amplifier circuit 40*b* or to the multiplexer circuit 47 thereby rendering the second intermediate frequency amplifier circuit 40*b* or the multiplexer circuit 47 inoperative. Moreover, the output of the electrostatic field detection circuit 34*a* is utilized to make the electronic muting switching circuit 54*a* on or off.

While a part of the output signal of the FM detector circuit 41 is supplied as the AFC signal through the electronic AFC switching circuit 54*b* to the local oscillator circuit 38 to control the oscillation frequency thereof. The output of the electrostatic field detection circuit 34*b* is utilized to make the electronic AFC switching circuit 54*b* on or off.

The electrostatic field detection circuits 34*a* and 34*b* are connected to the connection terminals 32 and 33 of the tuning knob 20 shown in FIG. 4, respectively.

The operation of the embodiment shown in FIG. 8 is as follows. If the operator makes his fingers in touch with both the first and second tuning knob members 28 and 29 for the purpose of selecting a desired broadcasting station, the electrostatic field established at the operator's human body is applied to the electrostatic field detection circuits 34*a* and 34*b*, respectively, which detect the electrostatic field and operate to make the electronic muting switching circuit 54*a* on and the electronic AFC switching circuit 54*b* off. Thus, the AFC operation is stopped and the muting operation becomes started, thereby effecting the correct tuning of selecting the broadcasting station in a smooth manner. If the operator releases his fingers from the first and second tuning knobs 28 and 29 after the selection of the station has been completed, the electronic muting switching circuit 54*a* becomes automatically off and the electronic AFC switching circuit 54*b* becomes on, thereby stopping the muting operation and simultaneously beginning the AFC operation resulting in a signal reception with a correctly tuned condition. This operation can automatically be effected when the operator touches or release his fingers with or from the first and second tuning knob members 28 and 29 so that it can be effected by those without having any knowledge relating to AFC and muting operations in an extremely easy manner. If the first tuning knob member 28 only is touched during the tuning operation, the operation of the muting circuit only is possible. Similarly, if the second tuning knob member 29 only is touched during the tuning operation, the AFC circuit only becomes off while the muting circuit becomes also off so that reception of broadcasting signal which is so weak that it is masked by the inter-station noise produced at the time of detuning is possible.

Figure 9:
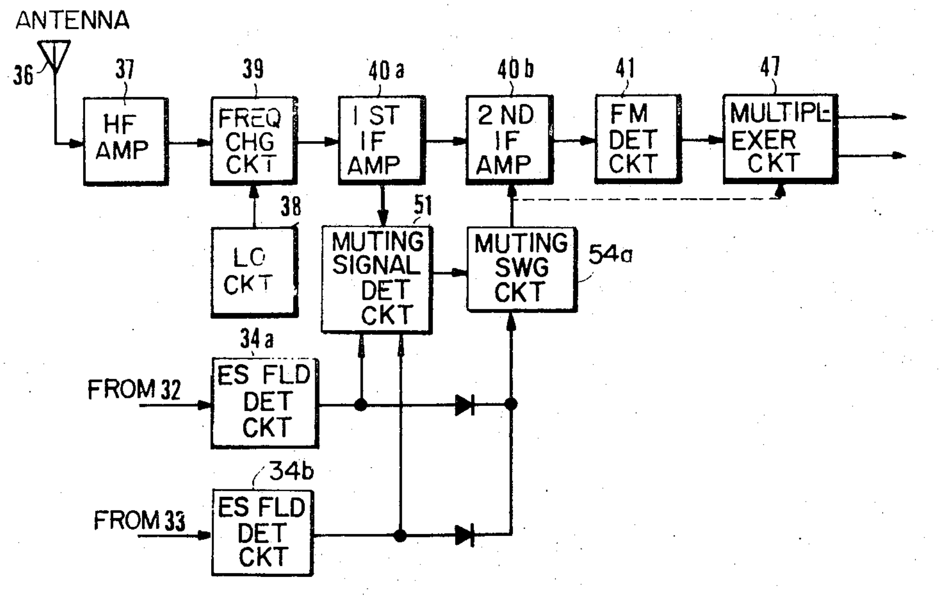

In FIG. 9 is shown another embodiment of the tuning device for receivers according to the invention which is capable of suitably changing the muting level in response to the touching manner with the knob members.

In the present embodiment, the presence or absence of the broadcasting signal at the first intermediate frequency amplifier circuit 40a is detected by the muting signal detection circuit 51 whose detecting level is controlled by the electronic control signal. The signal thus detected, i.e. the muting signal is supplied through the electronic muting switching circuit 54a to the second intermediate frequency amplifier circuit 40b or to the multiplexer circuit 47. This electronic muting switching circuit 54a is controlled by the electronic control signal and constitutes a muting control circuit together with the muting signal detection circuit 51. In the present embodiment, in order to make the electronic muting switching circuit 54a on or off and control the detecting level of the muting signal detection circuit 51, the output terminals of the electrostatic field detection circuits 34a and 34b are connected to both the muting signal detection circuit 51 and the electronic muting switching circuit 54a, respectively. The input terminals of the electrostatic field detection circuits 34a and 34b are connected to the connection terminals 32 and 33 of the tuning knob member 20, respectively.

Figure 12:
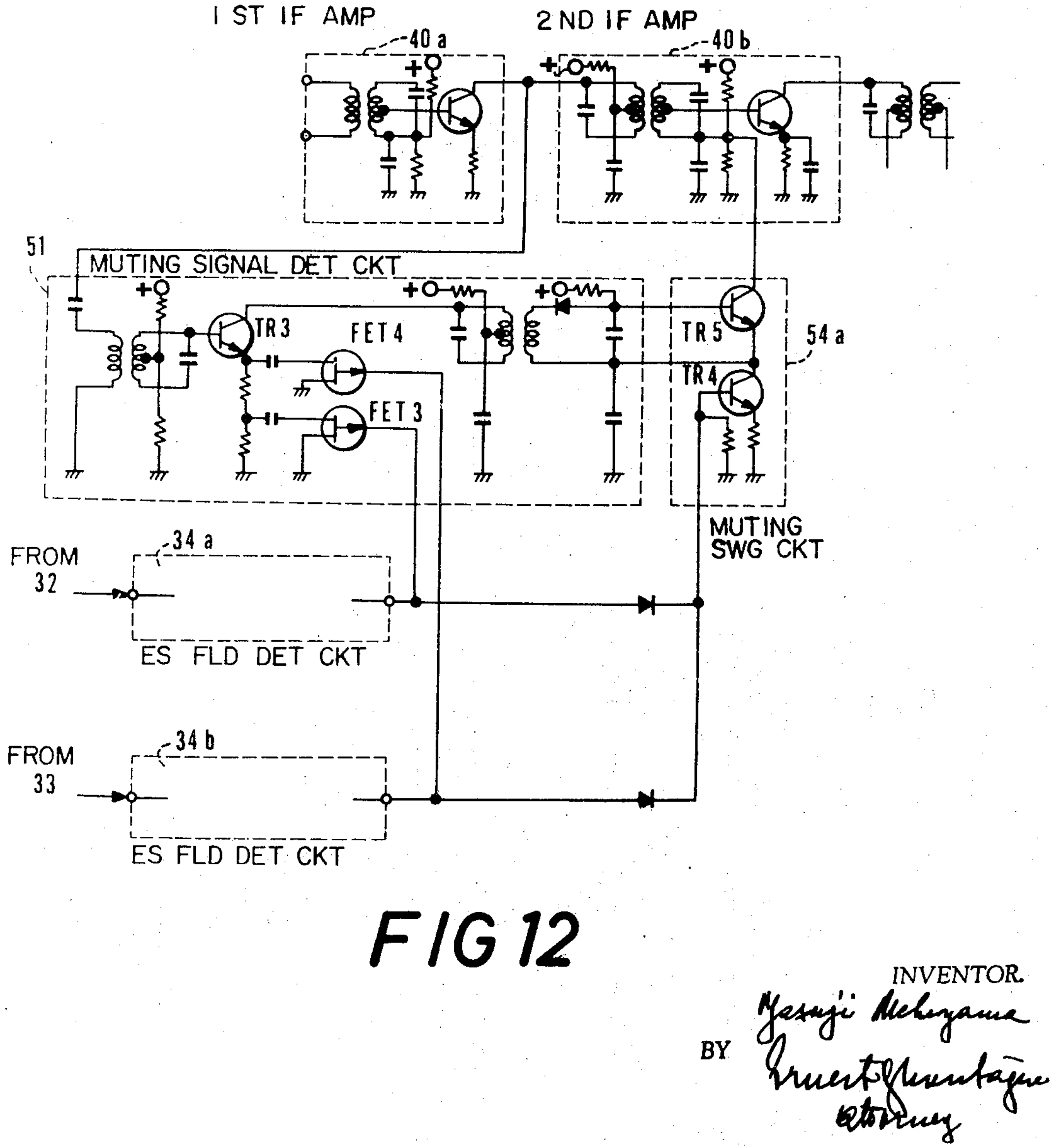
FIG. 12 is a connection diagram showing in details one embodiment of circuit elements of the intermediate frequency amplifier circuits, muting signal detector circuit, electronic muting switching circuit etc. used in the tuning device for receivers according to the invention shown in FIG. 9.

In FIG. 12 is shown one embodiment of circuit elements and connection thereof of the first and second intermediate frequency amplifier circuits 40a, 40b, muting signal detection circuit 51 and electronic muting switching circuit 54a.

The muting signal detection circuit 51 essentially consists of an amplifier whose gain is variable comprising a transistor $TR_3$, and depletion type field effect transistors $FET_3$, $FET_4$ etc. The outputs from the electrostatic field detection circuits 34a and 34b are supplied to the gates of the field effect transistors $FET_3$ and $FET_4$, respectively, to control the gain of the broadcasting signal from the first intermediate frequency amplifier circuit 40a. The electronic muting switching circuit 54a consists of a logic AND circuit comprising transistors $TR_4$, $TR_5$ etc. The common output from the electrostatic field detection circuits 34a and 34b is supplied to the base of the transistor $TR_4$ which then becomes conductive, while the output signal from the muting signal detection circuit 51 is supplied to the base of the transistor $TR_5$ which then becomes nonconductive, thereby controlling the gain control end of the second intermediate frequency amplifier circuit 40b in AND control manner.

The operation of the embodiment shown in FIGS. 9 and 12 is as follows. In case of selecting a desired broadcasting station if either one of the first and second tuning knob members 28 and 29 is touched and the tuning knob 20 is manually rotated to drive through the rotary shaft 25 the tuning gang variable capacitors, a selection of any desired broadcasting station is possible. If the operator makes his fingers in touch with the first tuning knob member 28, the electrostatic field established at the operator's human body is applied from the first tuning knob member 28 through the rotary shaft 25 and bearing 23 to the electrostatic field detection circuit 34a, whose output signal is in turn applied to the field effect transistor $FET_3$ of the muting signal detection circuit 51 to increase the resistance between the source and drain thereof. In this case no input is applied to the gate of the other field effect transistor $FET_4$ so that the resistance between the source and drain thereof becomes descreased. Thus, the gain of the amplifier inclusive of the transistor $TR_3$ becomes comparatively large. Thus, even when a comparatively weak broadcasting signal (for example stronger than A in FIG. 11) is received, a comparatively strong output can be obtained from the muting signal detection circuit 51. This output is applied to the transistor $TR_5$ of the electronic muting switching circuit 54a to make the transistor $TR_5$ nonconductive. At the same time, the output signal from the electrostatic field detection circuit 34a is supplied to the transistor $TR_4$ of the electronic muting switching circuit 54a to make the transistor $TR_4$ conductive. Thus, the muting switching circuit 54a becomes off and hence the second intermediate amplifier circuit 40b normally operates to release the muting operation.

That is, if the detuning occurs under the condition that the operator places his fingers in touch with the first tuning knob member 28, the transistor $TR_4$ of the electronic muting switching circuit 54a becomes conductive, while the absence of the broadcasting signal makes the transistor $TR_5$ also conductive. Thus, the electronic muting switching circuit 45a becomes on thereby rendering the second intermediate frequency amplifier circuit 40b inoperative, i.e. ensures a muting condition. In this muting condition if the broadcasting signal whose level is comparatively low (more than point A shown in FIG. 11) is received, the transistor $TR_5$ becomes nonconductive to release the muting operation. That is, a comparatively small input can be used to release the muting operation.

If the operator touches his fingers to the second tuning knob member 29, the muting signal detection circuit 51 produces the output signal to increase the resistance between the source and drain of the field effect transistor $FET_4$ while the resistance between the source and drain of the other field transistor $FET_3$ becomes small, so that the gain of the amplifier inclusive of the transistor $TR_3$ becomes smaller than that as described before. Thus, the transistor $TR_5$ of the electronic muting switching circuit 54a becomes nonconductive until the broadcasting signal on the medium order (for example, more than the point B shown in FIG. 11) is received. At the same time, the transistor $TR_4$ becomes conductive to release the muting operation of the second intermediate frequency amplifier circuit 40b. That is, the muting release operation can be effected by the input whose level is on the medium order.

If the operator places his fingers in touch with both the first and second tuning knob members 28 and 29, the resistances between the sources and drains of both the field effect transistors $FET_3$ and $FET_4$ of the muting signal detection circuit 51 are increased to considerably decrease the gain of the amplifier inclusive of the transistor $TR_3$. Thus, the muting operation can be released until the large broadcasting signal (for example, more than the point C shown in FIG. 11) is received. That is, the muting release operation can be effected by a comparatively large input level.

If the receiver is correctly tuned and the operator puts his fingers out of the tuning knob, no electrostatic field input is applied to the electrostatic field detection circuits 34a and 34b. The transistors of the electrostatic field detection circuits operate in the sense opposite to that as described above with the result that the transistor $TR_4$ of the electronic muting switching circuit 54*a* becomes nonconductive. Thus, the electronic muting switching circuit 54*a* becomes off to restore the second intermediate frequency amplifier circuit 40*b* to its normal operating condition, thereby maintaining the muting effect in its off condition.

Thus, the muting level can be controlled in dependence with three modes of operation, that is either one or both of the first and second tuning knob members 28 and 29 are in touch with the operator's fingers. The relation between the three modes of touching the tuning knob and receivable broadcasting signals is shown in the following Table 3.

TABLE 3

| Knob | Receivable broadcasting signal |
|---|---|
| 28 | Weak (Point A shown in FIG. 11) |
| 29 | Medium (Point B shown in FIG. 11) |
| 28+29 | Strong (Point C shown in FIG. 11) |

As seen from Table 3, a suitable selection of any one of the above mentioned three modes of touching in dependence with the strength of the receiving broadcasting signal whose frequency is to be selected ensures removal of interstation noise at the time of detuning with ease of tuning and hence the optimum selection of the frequency from a given broadcasting station. Thus, it is possible to effect the tuning operation even for the weak broadcasting signal in an easy manner.

Figure 10:
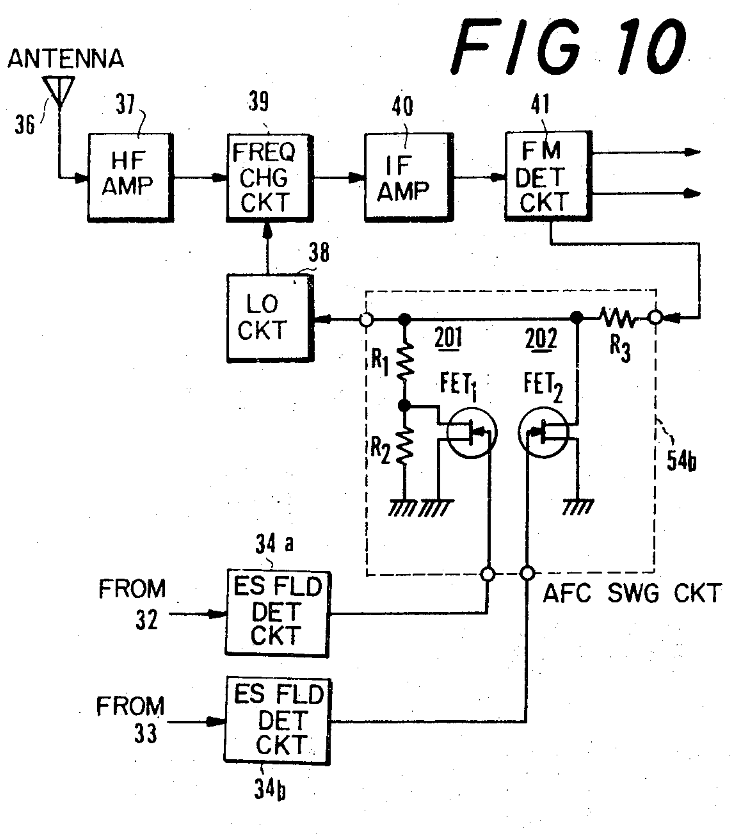
Figure 11:
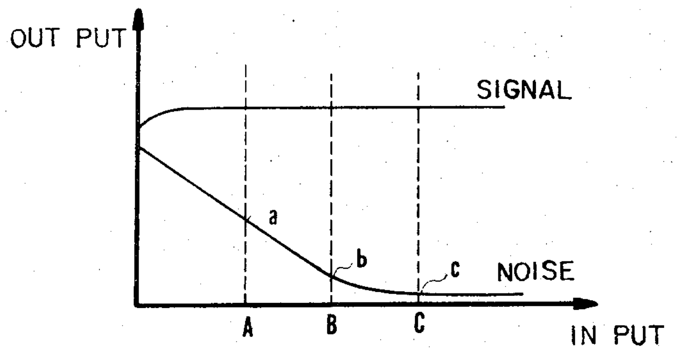
FIG. 11 is a graphical representation of the relation between the input to the electronic muting circuit and the output therefrom for explaining the tuning device for receivers according to the invention shown in FIG. 8.

In FIG. 10 is shown a modified embodiment of the tuning device for receivers according to the invention which is capable of automatically controlling the operation of the AFC circuit in response to the touching manner with the knob members.

The AFC signal from a part of the EM detection circuit 41 is applied through an electronic AFC switching circuit 54*b* to the local oscillator circuit 38. The output terminals of the two electrostatic field detection circuits 34*a* and 34*b* are connected to the electronic AFC switching circuit 54*b* so as to make it on or off and control the level of the AFC signal at the on condition thereof. The input terminals of the electrostatic field detection circuits 34*a* and 34*b* are connected to the connection terminals of the tuning knob 20. The electronic AFC switching circuit 54b consists of a gain control means 201 comprising fixed resistors $R_1$, $R_2$ and an enhancement type field effect transistor $FET_1$ etc. and a switching means 202 comprising the same type field effect transistor $FET_2$ etc. The outputs from the electrostatic field detection circuits 34*a* and 34*b* are supplied to the field effect transistors $FET_1$ and $FET_2$, respectively, as the gate input thereof which serves to effect the gain control and on or off control of the AFC signal from the FM detector circuit 41.

In case of selecting a desired broadcasting station, if the operator manually rotate the tuning knob 20, the gang variable capacitor is driven by the rotary shaft 25 to select the desired broadcasting station. If the first tuning knob member 28 only is touched by the operator's fingers the electrostatic field established at the operator's human body is applied through the tuning knob member 28, rotary shaft 25, bearing 23, connection terminal 32 to the electrostatic field detection circuit 34*a* which produces an output that is supplied to the field effect transistor $FET_1$ of the electronic AFC switching circuit 54*b* to make it conductive. While no input is supplied to the gate of the other field effect transistor $FET_2$ which becomes nonconductive. That is, the switching means is on so that the AFC signal from the FM detector circuit 41 is supplied to the gain control means 201 of the electronic AFC switching circuit 54*b* and the gain of the AFC signal is divided into a given value by means of the resistors $R_1$ and $R_2$ and then is applied to the local oscillator circuit 38 thereby supplying a weak AFC to the receiver. In this condition the tuning can easily be effected when one station broadcasting weak signal is changed over to another station broadcasting weak signal.

If the operator puts his fingers in touch with the second tuning knob member 29, the electrostatic field detection circuit 34*b* produces an output signal which is then applied to the field effect transistor $FET_2$ of the electronic AFC switching circuit 54b to make the field effect transistor $FET_2$ conductive. That is, the switching member becomes off so that the AFC signal from the FM detector circuit 41 is interrupted and is not supplied to the local oscillator circuit 38 irrespective to the condition of the gain control member 201. Thus, the AFC operation becomes off. In this condition, it is possible to tune the reciver with any broadcasting signal. For example, it can easily be tuned with a weak broadcasting signal just near in frequency to the strong broadcasting signal.

If the operator puts his fingers in touch with both the first and second tuning knob members 28 and 29, the condition obtained is the same as that obtained when the operator puts his fingers in touch with the second tuning knob member 29 only.

If the receiver becomes substantially tuned condition and the operator puts his fingers off the tuning knob, no electrostatic field input is supplied to the electrostatic field detection circuit in which the transistors operate in the manner opposite to the operation as described above. Thus, both the field effect transistors $FET_1$ and $FET_2$ become off to make the switching member 202 on. The gain of the gain control member 201 become sufficiently large so that the AFC signal proper from the FM detector circuit 41 is applied to the local oscillator circuit 38. Then, the receiver is under a complete AFC condition and becomes automatically stable at a completely tuned point.

Thus, the degree of the AFC applied can be controlled in dependence with the mode of the touch by the operator's fingers i.e. whether they are in touch with either one of the tuning knob members. The above mode of the operator's finger touch can suitably be selected in accordance with the condition of the broadcasting station to be selected. If the operator puts his fingers off the tuning knob the AFC control is completely effected so that the ultimate degree of the AFC control can be increased to stabilize the tuning condition.

Figure 13:
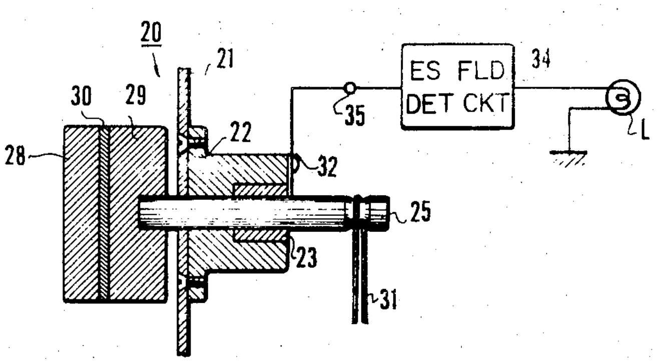
FIG. 13 shows a dial illuminating device used in the tuning device for receivers according to the invention, a part of the tuning knob member being shown in section and the electrostatic field detection circuit being shown by a block diagram.

In FIG. 13 is shown a device for illuminating a dial for use in the above mentioned tuning device for receivers according to the invention, in which the electrostatic field established at the operator's human body and electrostatically induced in the tuning knob 20 is used to automatically light a lamp for illuminating the dial.

The thickness of the second tuning knob member 29 is made larger than that of the first runing knob member 28 and secured to one end of the rotary shaft 25.

The rotary shaft 25 extends through the front panel 21 and is rotatably journalled in the bearing holder 22. made of electrically insulating material. A part of the rotary shaft 25 makes electrical contact with the bearing sleeve 23 secured to the inner peripheral wall of the bearing holder 22.

The connection terminal 32 secured to the bearing sleeve 23 is connected to the input terminal 35 of the electrostatic field detection circuit 34 shown in FIGS. 5 and 6 whose output terminal is connected to a dial illuminating lamp L.

Figure 14:
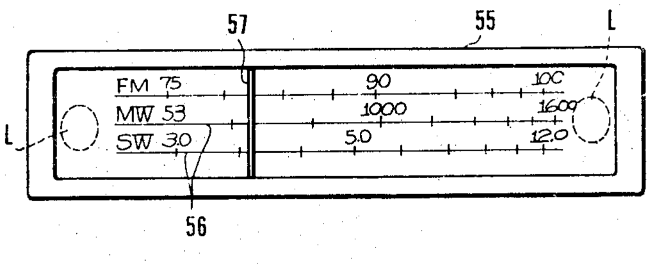
FIGS. 14 and 15 are front elevations showing dial plates provided with the dial illuminating device shown in FIG. 13, repectively.

In FIG. 14 is shown a dial 55 provided at its both ends with two dial illuminating lamps L connected in parallel. The dial 55 is provided with scales 56 for different broadcasting frequency bands and an indicator needle 57. The scales 56 and indicator needle 57 are illuminated by the illuminating lamps L.

The indicator needle 57 is driven by the belt 31 which is in engagement with the rotary shaft 25 and adapted to drive the element for determining the frequency to be tuned such as the variable capacitor.

In the day time etc. when the outside is in the light by the sum beam, if the operator manually touches the first tuning knob member 28 which is insulated by the insulating plate 30 from the second tuning knob member 29, the electrostatic field established at the operator's human body is not applied to the electrostatic field detection circuit 34 so that the dial illuminating lamp L is not lit up. Thus, the waste of electric power due to the unnecessary illumination of the dial 55 can be eliminated.

At night or in darkness etc. when the sun beam is absent, if the operator manually touches the second tuning knob 29, the electrostatic field established at the operator's human body is applied from the second tuning knob member 29 through the rotary shaft 25, bearing sleeve 23, and connection terminal 32 to the electrostatic field detection circuit 34 to energize the dial illuminating lamp L to illuminate the scales 56 and the indicator needle 57. As a result of this, the selection of the broadcasting stations can reliably be effected.

After the desired broadcasting station has been selected, if the operator puts his fingers off the second tuning knob 29, no electrostatic field input is applied to the electrostatic field detection circuit 34 with the result that the current supply to the dial illuminating lamp L is interrupted to automatically extinguish the dial illuminating lamp L.

Figure 15:
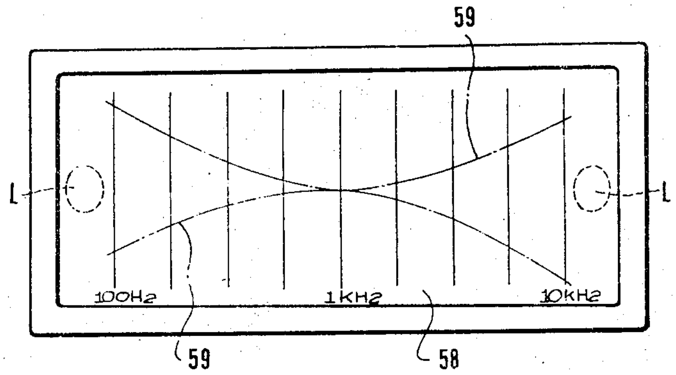

In FIG. 15 is shown a dial plate 58 for indicating the degree of tone quality control which is provided at its both ends with the lamps L. These lamps L can automatically be energized or deenergized by means of the tuning knob 20 shown in FIG. 13 which is now used as a tone quality control knob, whereby a location of flexible bands 59 for indicating frequency characteristic can be clearly illuminated.

Thus, the dial illuminating device shown in FIG. 13 can be used to advantage in portable raido receivers for which the supply source battery must be saved.

Figure 16:
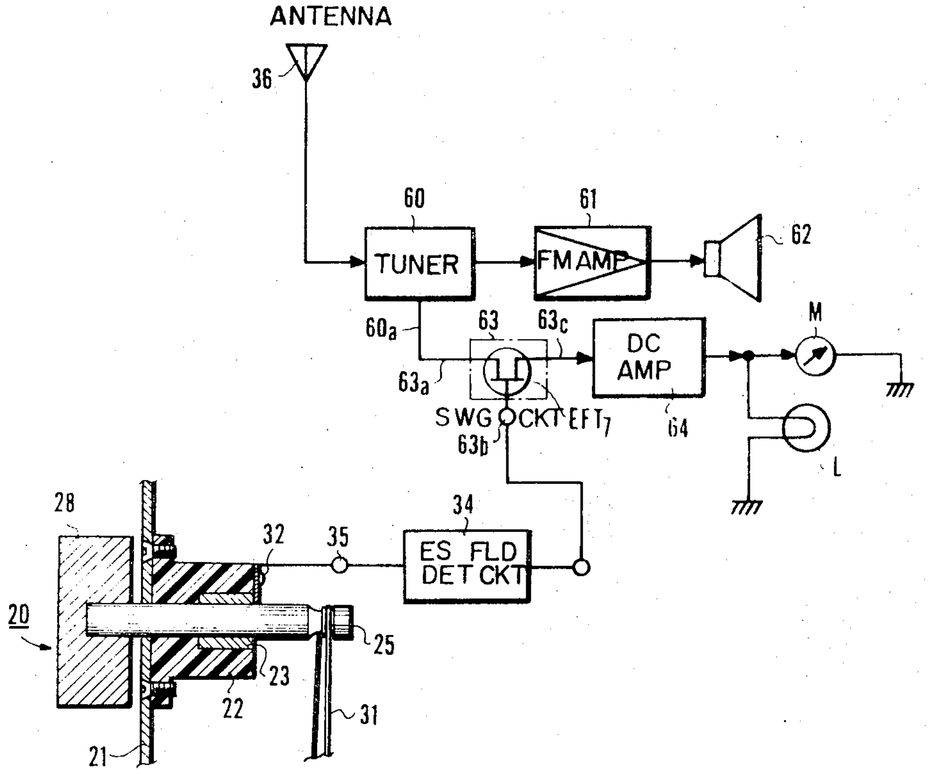
FIG. 16 is a block diagram showing a tuning point indicator device used in the tuning device for receivers according to the invention, the tuning knob member being shown in section.

In FIG. 16 is shown a device for indicating the tuning point of receivers. The receiver is so constructed that a number of electric waves arrived at the antenna 36 are supplied to a conventional tuner 60 which effects tuning, selection and amplification to produce a desired electric wave which is then demodulated to a sound signal that is applied to an audio frequency amplifier 61 which amplifies the sound signal. The output of the audio frequency amplifier 61 is supplied to a loudspeaker 62 by which a desired broadcasting program can be heard.

The direct current component produced at a given point at the tuner 60 such as the output terminal of the demodulator circuit or detector circuit and having a level corresponding to the strength of the desired arrived electric wave is derived from a tuner terminal *60a* and is applied to an input terminal *63a* of a switching circuit 63, for example, source or drain of a field effect transistor $FET_7$. To a controlled terminal *63b* of the switching circuit 63, that is, a gate is connected the output terminal of the electrostatic field detection circuit 34.

The output terminal *63c* of the switching circuit 63, that is, the drain or source of the field effect transistor $FET_7$ is connected through a direct current amplifier circuit 64 to a meter M for indicating the tuned point or the above mentioned lamp L or both of them. The switching circuit 63 is so constructed that it becomes conductive when it receives detected signal from the circuit 34.

To the input terminal 35 of the electrostatic field detection circuit 34 is connected the connection terminal 32 of the tuning knob 20 having the first tuning knob member 28 only.

The operation of the embodiment shown in FIG. 16 is as follows. In case of selecting a desired broadcasting station, if the operator touches his fingers with the tuning knob 20 to turn it, the electrostatic field established at the operator's human body is applied through the connection terminal 32 to the electrostatic field detection circuit 34 whose output makes the switching circuit 63 conductive. In this case, if the tuner 60 is not yet tuned with the desired arrived electric wave, the meter M or lamp L remains inoperative and the tuning point is not indicated.

If the operator manually operates the tuning knob 20 to select the desired arrived electric wave and makes tune the tuner 60 with it, the direct current component from the tuner 60 is supplied through the switching circuit 63 which is now conductive to the input terminal of the direct current amplifier circuit 64 whose output is applied to the meter M or lamp L thereby indicating the correct tuned point of the tuner 60 with the desired arrived electric wave with the result that the operator can receive and hear his desired broadcasting program.

If the operator puts his fingers off the tuning knob 20, no electrostatic field is applied to the electrostatic field detection circuit 34 and the switching circuit 63 becomes off. Thus, the meter M or lamp L becomes deenergized and the operator can enjoy his desired broadcasting program. Moreover, the cutting-off of the current through the meter M or lamp L results in an economy in the electric power consumption.

During the tuning operation if the operator temporarily puts his fingers off the tuning knob 20, there is a risk of the indicator needle of the meter M being swung back or the lamp L being extinguished. Such disadvantage may be avoided if the time constant of the switching operation of the electrostatic field detection circuit 34 is made comparatively large (about 0.5 second). Thus, it is possible to indicate the tuning point by the indicator needle of the meter M or remain the lamp L in its lit up condition for a desired duration thus rendering the device convenient in practical use.

It may be clear that the use of the tuning point indicator device shown in FIG. 16 is not restricted to the radio receivers, and that the same may be applied to indicate channels of television receivers or fine tuning thereof.

What is claimed is:

1. A tuning device for receivers comprising
a tuning knob means for selecting a desired broadcasting station insulated from the ground and manually operated by an operator to detect an electrostatic field at the operator's human body,
an electrostatic field detection circuit means connected to said tuning knob means and for effecting a switching operation,
an electronic switching circuit connected to said electrostatic field detection circuit means and adapted to be controlled to on or off condition in accordance with the output signal from said electrostatic field detection circuit means,
said tuning knob means comprises first and second tuning knob members insulated one from the other and made of an electric conductive material,
a belt,
a tuning circuit element, the latter having a rotating shaft,
a rotary shaft secured at its one end to each of said first and second tuning knob members and connected at another end through said belt to said rotating shaft of said tuning circuit element,
a first bearing electrically connected to said first tuning knob member and made of an electric conductive material,
a second bearing connected to said second tuning knob member, and a bearing holder for supporting said rotary shaft, and said bearing holder made of an insulating material.

2. A tuning device for receivers comprising
a tuning knob insulated from the ground for detecting an electrostatic field established at an operator's human body to select a desired broadcasting station,
an electrostatic field detection circuit means for effecting a switching operation by means of said electrostatic field established at an operator's human body,
an intermediate frequency amplifier circuit,
a muting signal detector circuit for detecting presence or absence of a broadcasting signal in said intermediate frequency amplifier circuit,
a multiplexer circuit, and
an electronic muting switching circuit connected between said muting signal detector circuit and at least one of two circuits consisting of said intermediate frequency amplifier circuit and said multiplexer circuit and operatively connected to said electrostatic field detection circuit means and adapted to be controlled to on or off condition by means of the output signal from said electrostatic field detection circuit means.

3. A tuning device for receivers comprising
a tuning knob including first and second tuning knob members electrically insulated one from the other and each made of an electric conductive material,
first and second electrostatic field detection circuit means each for effecting a control operation in response to an electrostatic field respectively, arising when an operator places his fingers in contact with at least one of said tuning knob members at the time of selecting a desired broadcasting station,
a first and second intermediate frequency amplifier circuit,
a muting signal detector circuit for detecting presence or absence of broadcasting signal in said first intermediate frequency amplifier circuit,
a multiplexer circuit,
a level control circuit connected between said muting signal detector circuit and at least one of two circuits consisting of said second intermediate frequency amplifier circuit and said multiplexer circuit and adapted to be controlled by the output from each of said first and second electrostatic field detection circuit means.

4. A tuning circuit for receivers comprising
a tuning knob including first and second tuning knob members electrically insulated one from the other and made of an electric conductive material,
first and second electrostatic field detection circuit means each for effecting a switching operation when an operator places his fingers in contact with at least one of said knob members at the time of selecting a desired broadcasting station,
a first and second intermediate frequency amplifier circuit,
a muting signal detection circuit for detecting the presence or absence of the broadcasting signal in said first intermediate frequency amplifier circuit,
a multiplexer circuit,
an electronic muting switching circuit connected between the output terminal of said muting signal detection circuit and at least one of said second intermediate frequency amplifier circuit and said multiplexer circuit and on or off controlled by means of said first electrostatic field detection circuit means, and
a local oscillation circuit,
a detector circuit operatively connected between said second intermediate frequency amplifier circuit and said multiplexer circuit,
an AFC electronic switch connected between said local oscillation circuit and said detector circuit and on-off controlled by means of said second electrostatic field detection circuit means.

5. A tuning device for receivers comprising
a tuning knob comprising a plurality of tuning knob members each made of an electric conductive material and electrically insulated one from the other, one of said tuning knob members being rotated for selecting a desired broadcasting station,
first and second electrostatic field detection circuit means for effecting switching operations in dependency upon the condition of contact of the operator's fingers with said plurality of tuning knob members at a time of selecting a desired broadcasting station,
a first and second intermediate frequency amplifier circuits,
an electronic muting signal detection circuit means for detecting the presence and absence of the broadcasting signal in said first intermediate frequency amplifier circuit and for effecting a level control by means of the output from both said electrostatic field detection circuit means, a multiplexer circuit, and an electronic muting switching circuit connected between the output terminal of said muting signal detector circuit means and at least one of said second intermediate frequency amplifier circuit and said multiplexer circuit and adapted to be on-off controlled by means of the output from said first and second electrostatic field detection circuit means.

6. A tuning device for receivers as set forth in claim 5, further comprising a first transistor and a pair of transistors, said muting signal detection circuit means consists of said first transistor for amplifying the output from said first intermediate frequency amplifier circuit and of said pair of transistors on-off controlled by means of the output from said first and second electrostatic field detection circuit means for controlling the degree of amplification of said first transistor.

7. A tuning device for receivers, as set forth in claim 5, wherein said electronic muting switching circuit includes two transistors connected with the emitter of one of said two transistors connected to the collector of the other of said two transistors between an input terminal of said second intermediate frequency amplifier circuit and the ground, the base of said one of said two transistors being connected to the output terminal of said muting signal detector circuit means and the base of said other of said two transistors being connected in common to both the output terminals of said first and second electrostatic field detection circuit means.

8. A tuning device for receivers comprising a tuner for a receiver, said tunner having a tuning circuit, a loud speaker, an audio frequency amplifier for amplifying the output signal from said tuner and connected to said loud speaker to produce sound from said loud speaker, a tuning knob insulated from the ground for detecting an electrostatic field established at an operator's human body, a switching circuit, connected to said tuning circuit, an electrostatic field detection circuit means operatively connected to said tuning knob for effecting an on switching operation of said switching circuit by means of the electrostatic field established at the operator's human body when the operator touches his fingers with said tuning knob, and an indicator device operatively connected to said switching circuit and for indicating the output level of said tuning circuit of said tuner when said switching circuit is on.

9. A tuning device for receivers as set forth in claim 8 wherein said indicator device comprises a lamp and a scale provided on a dial, said lamp for illuminating said scale, a meter means connected in parallel with said lamp for indicating said output level of said tuning circuit.

* * * * *